Feb. 10, 1942.  F. P. MERY  2,272,418

INTAKE MANIFOLD FOR EXPLOSION ENGINES, COMPRESSORS, PUMPS, AND THE LIKE

Filed Nov. 18, 1939

INVENTOR:
FRANCOIS PAUL MERY
BY Haseltine Lake & Co.
ATTORNEYS

Patented Feb. 10, 1942

2,272,418

UNITED STATES PATENT OFFICE 2,272,418

INTAKE MANIFOLD FOR EXPLOSION ENGINES, COMPRESSORS, PUMPS, AND THE LIKE

François Paul Méry, Marseilles, France

Application November 18, 1939, Serial No. 305,087
In France December 22, 1938

5 Claims. (Cl. 123—52)

A complete filling of the cylinders of an explosion engine with fresh gases is one of the principal conditions required for obtaining the highest efficiency from an engine.

Hitherto it has not been possible to fulfill this condition entirely, owing to the fact that the shapes of the present inlet pipes for said gases do not correspond to the normal conditions of flow of the gases, but on the contrary produce velocities and eddies which are so detrimental that the filling of the cylinders varies very considerably, according to whether the cylinders are located more or less close to the inlet of the intake manifold, this always being to the detriment of the efficiency of the engine.

These uncertainties, that may be considered as real drawbacks, are now eliminated by the object of the present invention which consists in an intake manifold of novel conception, intended to increase the efficiency of an engine by ensuring at all times a complete filling of all its cylinders with fresh gases whatever may be the positions occupied by the inlet orifices.

Said manifold is characterized by the fact that it is annular, and the pipes for conveying the gases to each of the cylinders are located outside the main passage of the gaseous stream in the annular pipe, each of said pipes being connected to the main pipe by widely flared portions. Owing to this very particular design, the gases that are flowing through the annular main pipe only undergo the effects of the sudden closing of the inlet valves in a very reduced manner, so that said gases retain their own kinetic energy which facilitates their entry into the next cylinder, since at the same time they are urged by their kinetic energy and are sucked by the piston.

The annular pipe and the pipes for conveying the gases into the cylinders, are shown in the accompanying essentially diagrammatical drawing which is given by way of explanation and which may also serve as a practical example of some of the embodiments that can be given to the object of the present invention. In said drawing.

Figure 1:
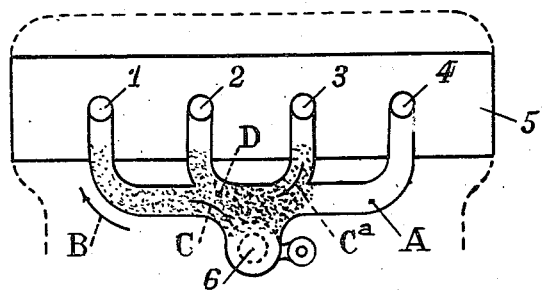
Fig. 1 shows an intake manifold in accordance with the classical shape.

In order to enable the principle of this invention to be better understood, it is necessary first of all to consider Fig. 1 which shows an ordinary intake manifold A of the most usual type, supplying the cylinders 1, 2, 3 and 4 of an explosion engine 5. Assuming that it is the suction stroke of cylinder No. 1, it will be observed that the gases sucked from the carburettor 6 form a gaseous stream which necessarily follows the direction of the arrow B and which, owing to the great difference of the volume of cylinder 1 as compared with that of the intake manifold A, acquires a high velocity which simultaneously gives it kinetic energy in the same direction; but as soon as the inlet valve suddenly closes on its seat, said velocity and said kinetic energy will be suddenly stopped and a regular gaseous "waterhammering" will then occur in this part of the manifold, which will have the immediate result of causing a back-flow towards the carburettor, in the direction of the arrow C, which will at the same time form a gaseous "stopper" D that will be interposed between the carburettor 6 and the cylinder 3 at the instant when the latter is about to start its suction stroke.

Since fluids are essentially resilient and undergo the effects of inertia, it inevitably follows that a part of the suction stroke of cylinder 3 will be employed to start the gaseous stream again by destroying the inertia of the gaseous stopper, before the effects of the suction are felt in the carburettor 6. But it must be particularly noted that as soon as the inlet valve of cylinder 3 suddenly closes on its seat, the same sudden stoppage effects will again occur in the gaseous stream with this difference viz. that as the pipe which supplies cylinder 3 is shorter than the one which supplies cylinder 1, the back-flow of the gaseous stream in the direction of the arrow $C^a$ will be of greater hindrance to the suction stroke of cylinder 2, since the gaseous "stopper" D will be more compressed between this inlet and the carburettor 6.

These same phenomena of the formation of gaseous streams that acquire an increasing velocity and are suddenly stopped after each intake period, constantly create as has just been shown disturbances by producing eddies in this same pipe which considerably hinder the rational intake of the gases to the cylinders and this, as will be understood, is always to the detriment of the efficiency, since under these disadvantageous conditions, the filling of the cylinders is never regular. These phenomena, which have hitherto escaped examination, now explain many of the causes of poor efficiency in explosion engines.

From the foregoing, it is obvious that if the gaseous stream supplying the cylinders of an explosion engine is not stopped in its velocity and in its kinetic energy, the eddies, the backpressures and the gaseous stoppers do not occur, so that these causes of disturbances no longer exist and the cylinders will be completely filled because the gaseous stream will be subjected to two forces which facilitate the complete filling of the cylinders, first of all its speed that must be considered to be constant, and then the kinetic energy it produces, to which is added the suction of the cylinders.

Figure 2:
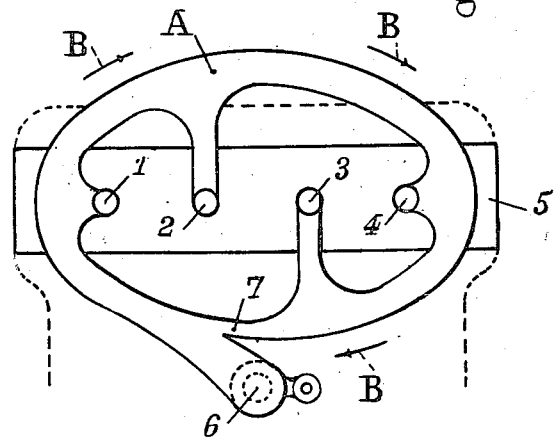
Fig. 2 shows an annular intake manifold in accordance with the principle of the invention.
Figure 3:
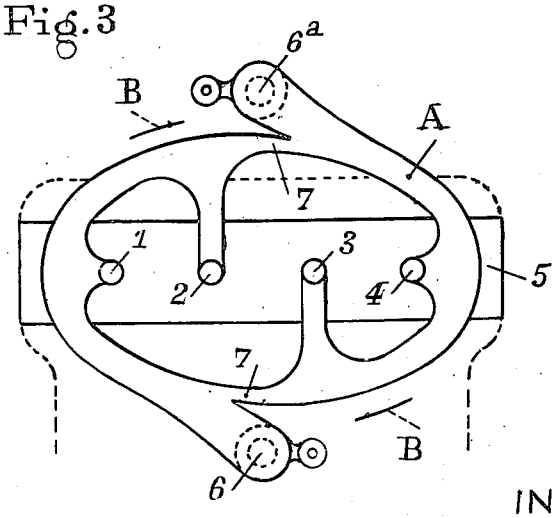
Fig. 3 shows one of the modifications that may be applied to this novel type of manifold.

The production of a gaseous supply stream which is constantly in motion in one gyratory direction is obtained in practice by means of the intake manifold shown in Figs. 2 and 3.

Thus, with the manifold shown in Fig. 2, the gases sucked from the carburettor 6 form a gaseous stream, the direction of which becomes gyratory, whereas the velocity of said gaseous stream is never stopped because it no longer undergoes the direct effects of the closing of the inlet valves as in the manifold shown in Fig. 1, since said valves act in the end of pipes E which are placed outside the circular pipe A, and said pipes E are provided with wide flared portions F.

It is obvious that in the example shown, as soon as the valve of the cylider I closes, the gaseous stream retains its kinetic energy and continues without hindrance or braking its forward movement in the direction of the arrow B in the annular pipe A, assisted in said forward movement by the suction of the piston in the cylinder 3 for example: the same applies to all the other cylinders which are thus completely filled in a regular and constant manner, because the gaseous stream no longer encounters obstacles that cause it to stop and produce eddies therein.

A slightly conical connection 7 is further provided which is placed at the end of the annular pipe A and connects same to the supply pipe from the carburettor 6; this conical portion is essentially intended to create a depression which co-operates with that produced by each of the suction strokes of the cylinders supplied by said pipe.

It will also be understood that it is possible to place a plurality of direct carburettors 6 or reversed carburettors 6a on the same intake manifold, and that the number of carburettors is not limitative, according to whether it is required to supply engines with 4, 6, 8 and 12 cylinders or even more.

The utilization of an annular-shaped intake manifold A with pipes E for conveying the gases to the cylinders, said pipes having widely flared portions F, is a most important advance as regards the efficiency of explosion engines operating with or without valves, owing to the fact that novel results are obtained which provide the following advantages:

1. Compulsory and identical filling of all the cylinders, operating at normal pressure, or with supercharging.

2. Production of a very thorough mixing by quick turbulence in the manifold itself, produced by the velocity, and if necessary the internal cross-section of the manifold may be made suitable for further increasing such turbulence.

3. Possibility of controlling the velocity of the gases by means of the dimensions of the manifold.

4. Production of an inlet temperature which is always homogeneous owing to the closed circuit of the gases in the annular manifold.

5. Use of ordinary or reversed carburettors.

However, the shapes, the dimensions and also the metals and materials used for the construction of the manifolds may be varied without for that reason changing the general arrangement of the invention which has just been described.

Thus, this arrangement of manifold can be applied with all its advantages to all apparatus using moving streams of gaseous or liquid fluids and members, valves or poppet-valves adapted to interrupt this movement, such as compressors, pumps and other like apparatus.

I claim:

1. An intake manifold for explosion engines, compressors, pumps and the like, which comprises an annular manifold pipe connected to the main intake fluid supply, and a separate inlet pipe for each cylinder, connected to said annular manifold pipe substantially transverse to that portion of the pipe to which each inlet pipe connects, and said inlet pipes being located outside the main annular axial line along which the intake fluid flows, whereby a stoppage of the flow of said fluid in the manifold when an inlet valve suddenly closes and the consequent uneven filling of the various cylinders are prevented.

2. An intake manifold for explosion engines, compressors, pumps and the like, which comprises an annular manifold pipe connected to the main intake fluid supply, and a separate inlet pipe for each cylinder, connected to said annular manifold pipe by a widely flared portion substantially transverse to that portion of the pipe to which each inlet pipe connects, and said inlet pipes being located outside the main annular axial line along which the intake fluid flows, whereby a stoppage of the flow of said fluid in the manifold when an inlet valve suddenly closes and the consequent uneven filling of the various cylinders are prevented.

3. An intake manifold according to claim 2, in which the annular manifold pipe is disposed substantially in a single plane and the flared portions of the inlet pipes are located in the same plane.

4. An intake manifold according to claim 2, wherein the annular manifold pipe is disposed in substantially a single plane and surrounds the inlet pipes as a group, and wherein the flared portions of said inlet pipes connect with said annular manifold pipe exclusively upon the inner periphery thereof.

5. An intake manifold according to claim 1, wherein the annular manifold pipe is located substantially in a single plane and surrounds the inlet pipes as a group, and wherein the portions of said inlet pipes which connect with the annular manifold pipe lie in substantially the same plane with the latter and connect with the latter exclusively upon the inner periphery thereof.

FRANÇOIS PAUL MÉRY.